UNITED STATES PATENT OFFICE.

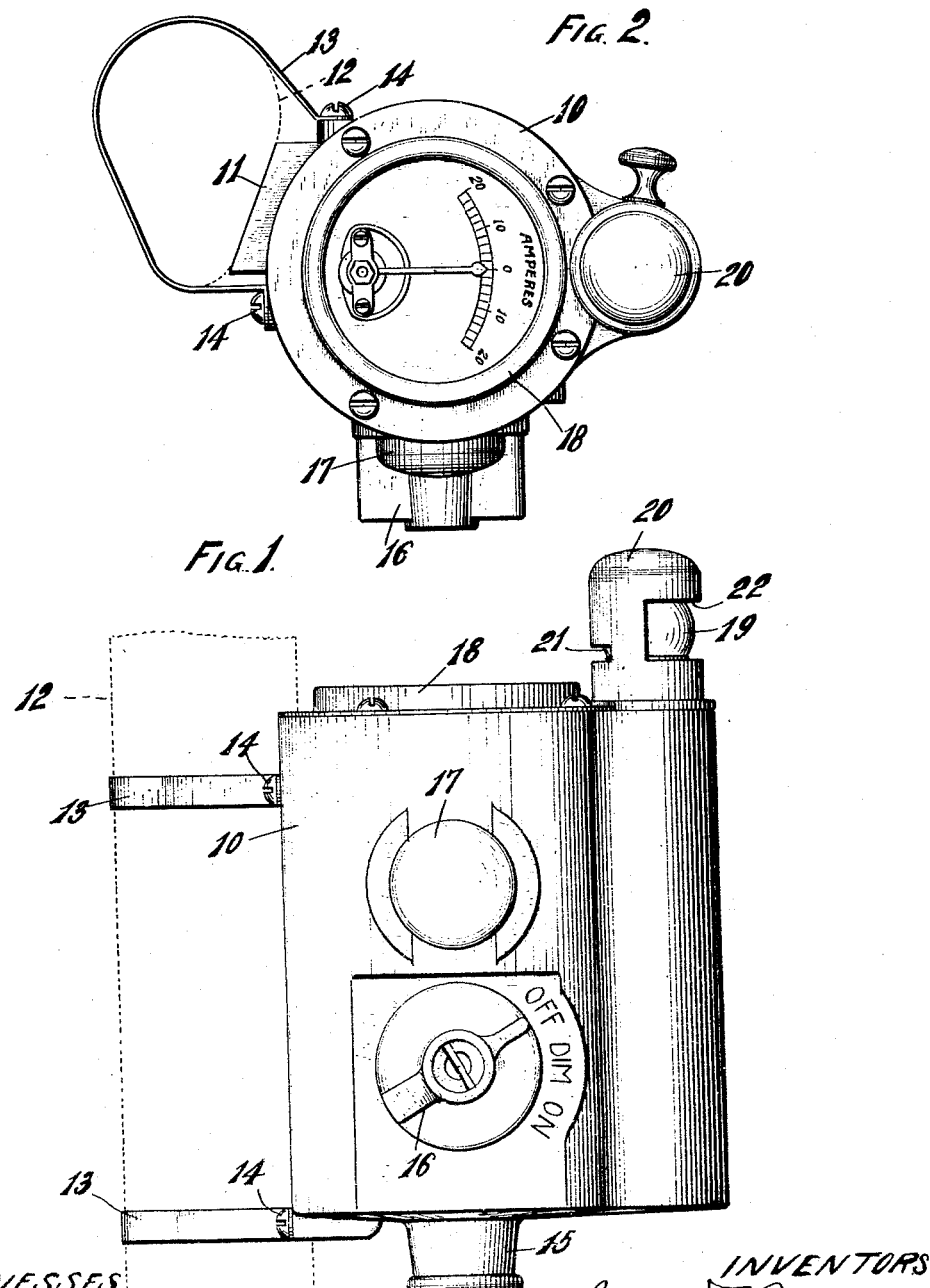

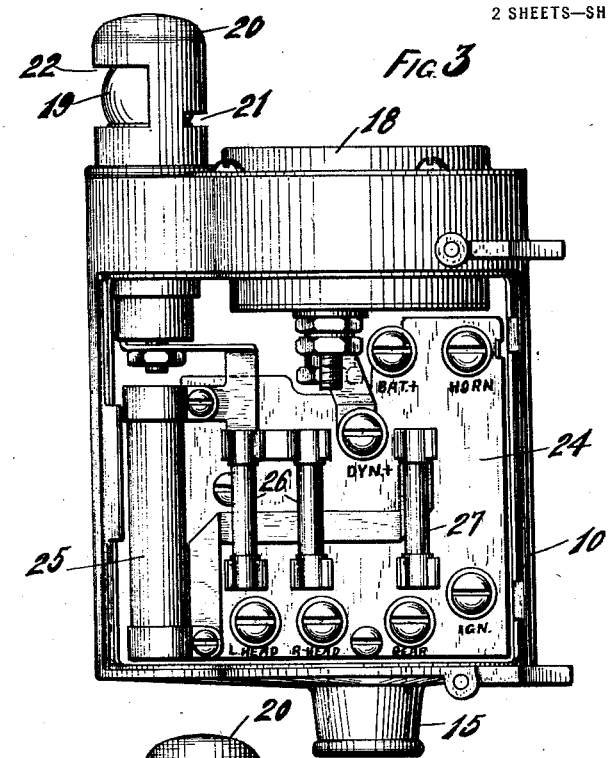
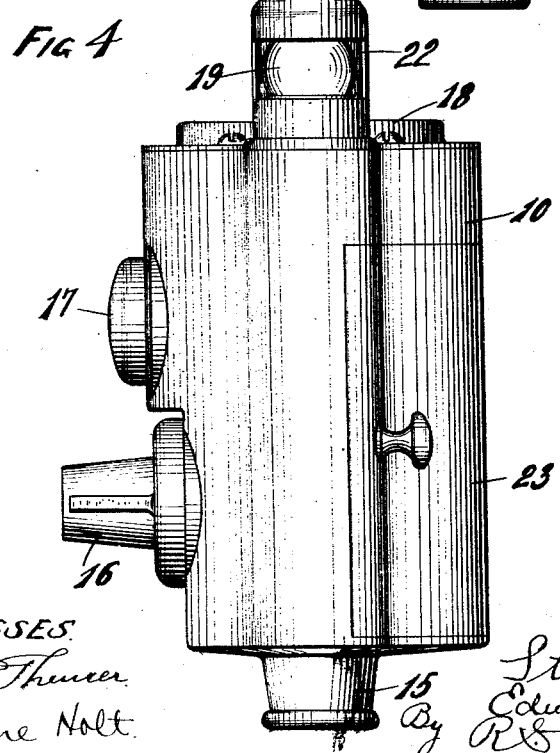

STEPHEN F. BRIGGS AND EDWARD N. JACOBI, OF MILWAUKEE, WISCONSIN, ASSIGNORS TO BRIGGS & STRATTON COMPANY, OF MILWAUKEE, WISCONSIN, A CORPORATION OF WISCONSIN.

STEERING-COLUMN CONTROL UNIT.

1,425,170.  Specification of Letters Patent.  Patented Aug. 8, 1922.

Application filed September 30, 1916. Serial No. 122,967.

*To all whom it may concern:*

Be it known that we, STEPHEN F. BRIGGS and EDWARD N. JACOBI, citizens of the United States, and residents of Milwaukee, in the county of Milwaukee and State of Wisconsin, have invented new and useful Improvements in Steering-Column Control Units, of which the following is a description, reference being had to the accompanying drawings, which are a part of this specification.

This invention has for its object to provide a terminal head for attachment to the steering column of an automobile and containing all electrical controlling devices heretofore mounted on the dash, including the key controlled ignition and lighting switch, the push button for the signal horn, the ammeter, the fuse block, the headlight dimming resistance and the dash light, thus permitting of the complete electrical installation in one department of the factory before the chassis receives the body.

Another object of the invention is to render these several electrical mechanisms more readily accessible to the driver by grouping them together on the steering column.

With the above and other objects in view the invention consists in the steering column control unit as herein claimed and all equivalents.

Referring to the accompanying drawings, in which like characters of reference indicate the same parts in the different views:

Fig. 1 is a front view of a steering column control unit constructed in accordance with this invention;

Fig. 2 is a plan view thereof;

Fig. 3 is a rear view with the hinge cover removed; and,

Fig. 4 is an edge view thereof.

In these drawings 10 indicates a shell-like casting forming a casing and provided with projecting bearing lugs 11 shaped to fit the steering column 12. Thin sheet metal clamping straps 13 pass around the steering column and their ends are secured to the casing 10 by screws 14 so that the casing is rigidly held in place on the steering column.

A tubular neck 15 on the bottom of the casing forms a cable opening through which the end of a cable extending up the steering column is passed to have its individual wires connected with the various devices contained in the cable head formed by the casing.

A key controlled lighting and ignition switch 16 is embodied in the lower front part of the casing, the casing constituting the usual front plate of the switch with the switch positions designated thereon, and directly above said switch is a push button 17 working through the casing for controlling the signal alarm. On top of the cylindrical main portion of the casing is the ammeter 18 indicating the prevailing condition in the storage battery circuit while the smaller cylindrical portion of the casing which is parallel thereto and merges therewith, has mounted on it an electric lamp 19 preferably surrounded by a metal shell forming a hood 20 with a narrow slot 21 on one side thereof to throw light upon the ammeter and a broader slot 22 on the opposite side to throw light on the speedometer or other instruments on the dashboard. The rear of the casing has a larged flanged opening normally covered by a hinged door 23 and through this opening access may be had to the electrical connections for the several parts above mentioned and also to a fuse panel 24 extending across the interior of the casing and having mounted thereon a dimming resistance coil 25 for the headlights and removable fuses 26 and 27 for the headlights and the rear light respectively.

With the steering column control unit of this invention there is no necessity for wiring the dash or any other part of the body of the automobile so that the control and indicating instruments may be permanently installed at the same time that the generator, battery, lighting and ignition systems are installed. This greatly simplifies the work in assembling the car and enables all of the electrical work to be done in one department of the factory, reducing the number of men required as well as the time consumed in making the installation, for with instruments mounted on the dash it has been necessary to provide one set of electrical workmen and engineers for installing the generator, the battery, the ignition system and the lights in the chassis assembling department, and another set of electrical workmen and engineers to connect up the controlling and indicating instruments on the dash in another department after the body has been secured in place. With this invention also there is no necessity for disturbing electrical connections if there is occasion to remove the body.

The present arrangement furthermore improves the appearance by removing parts from the dash and renders the fuse panel more accessible while bringing the lighting and ignition switch more conveniently within reach of the driver, a feature made particularly desirable by the prevailing practice of dimming headlights on approaching vehicles on country roads.

What we claim as new and desire to secure by Letters Patent is:

1. A steering column control unit comprising a casing having means for securing it to a steering column of an automobile, a fuse panel within the casing having fuse clips on one side thereof and forming a cable head, a lighting and ignition switch and a signal controlling push button on the other side of the fuse panel and projecting through the casing with connections passing through the fuse panel to the cable head, an electrical measuring instrument on the top of the casing, and an instrument and dashboard illuminating electric lamp mounted adjacent said instrument, said lamp provided with a hood having oppositely disposed light-directing openings, the instrument and light having connection with the cable head, whereby the dash and other parts of the automobile body are relieved of electrical connections.

2. A steering column control unit, comprising a casing having means for connecting it with the steering column of an automobile, a lighting and ignition switch and a signal push button mounted in the side of said casing, an ammeter mounted in the top of the casing, an instrument and dash-board illuminating lamp mounted at the top of the casing adjacent the ammeter, said lamp provided with a hood having oppositely disposed light-directing openings, a fuse panel forming a cable head mounted within the casing and having electrical connections with the aforesaid devices, and a movable closure in the casing providing access to the fuse panel, whereby said dash or other parts of the body are relieved of electrical connections.

3. A steering column control unit, comprising a casing having means for clamping it to a steering column and provided with an opening to receive the end of a cable, a key controlled lighting and ignition switch and a signal push button embodied in the front of the casing, an electrical measuring instrument mounted on the upper end of the casing, an instrument and dashboard illuminating electric lamp mounted adjacent said instrument, said lamp provided with a hood having oppositely disposed light-directing openings, there being an opening in the back of the casing, a movable cover therefor, and a fuse panel within the casing adapted to have electrical connection with the cable to form the terminal head therefor.

4. A steering column control unit, comprising a casing, bearing lugs projecting therefrom for engagement with a steering column, clamping straps secured to the casing and adapted to pass around the steering column, a tabular neck on the bottom of the casing adapted to admit the end of a cable to the interior of the casing, a key controlled lighting and ignition switch and a signal controlling push button embodied in the front of the casing, an electrical measuring instrument mounted on the top of the casing, an instrument and dashboard illuminating electric lamp mounted adjacent said instrument, said lamp provided with a hood having oppositely disposed light-directing openings, there being an opening in the rear of the casing, a movable door for closing the said opening, a fuse panel within the casing adapted for connection with the end of the cable and having connection with the several electrical devices before mentioned, and a dimming coil mounted on the fuse panel.

5. A steering column controlled unit, comprising a cylindrical casing with an ammeter forming the upper head thereof, means on the side of the cylindrical casing for clamping it to a steering column, an instrument and dashboard illuminating light mounted adjacent the ammeter and forming the upper end of a smaller cylindrical extension of the casing merging with the casing, a horn switch and a lighting switch on one side of the casing, a cable head within the casing, and a movable cover for an opening in the side of the casing through which access may be had to the cable head.

In testimony whereof, we affix our signatures, in presence of two witnesses.

STEPHEN F. BRIGGS.
EDWARD N. JACOBI.

Witnesses:
R. S. C. CALDWELL,
H. D. CHASE.